United States Patent [19]
Lohr et al.

[11] 3,718,344
[45] Feb. 27, 1973

[54] OCCUPANT-PROPELLED VEHICLE

[75] Inventors: Raymond J. Lohr; Calvin S. Cook, both of Erie, Pa.

[73] Assignee: Louis Marx & Co., New York, N.Y.

[22] Filed: Aug. 3, 1970

[21] Appl. No.: 60,540

[52] U.S. Cl..................280/261, 280/269, 280/282, 280/1.11 R, 280/96, 296/31 P, 296/28 B
[51] Int. Cl................................................B62m 1/02
[58] Field of Search..280/267, 268, 269, 1.11, 87.01, 280/282, 261, 96; 46/222, 223; 296/31 R

[56] References Cited

UNITED STATES PATENTS

| | | | |
|---|---|---|---|
| 2,986,400 | 5/1961 | Phillips | 280/269 X |
| 3,052,486 | 9/1962 | Malmquist | 280/1.11 A |
| 1,410,245 | 3/1922 | Enache | 280/261 |
| 1,088,185 | 2/1914 | Swender | 280/287 X |
| 3,551,003 | 6/1968 | O'Hara | 280/282 X |
| 2,633,378 | 3/1953 | Kraeft | 296/28 B |
| 2,696,387 | 12/1954 | Nordin | 280/282 X |
| 647,896 | 4/1900 | Crandall | 280/87.01 X |
| 576,746 | 2/1897 | Spangler | 280/261 X |

*Primary Examiner*—Kenneth H. Betts
*Assistant Examiner*—John P. Silverstrim
*Attorney*—Blum, Moscovitz, Friedman & Kaplan

[57] ABSTRACT

A miniature occupant-propelled surface vehicle. The vehicle includes a chassis formed of a body of sheet material which includes a seat as well as front and rear pairs of tubular portions and an intermediate pair of tubular portions. A front wheel assembly is operatively connected with the chassis at its front tubular portions, a rear wheel assembly is operatively connected with the chassis at its rear tubular portions, and an operator-actuated drive means is operatively connected with the chassis at its intermediate tubular portions. A transmission extends from the operator-actuated drive means to the rear wheel assembly for rotating the latter, and this transmission is situated at an elevation at least as high as the seat of the chassis. The chassis has an inner side wall portion extending upwardly from the seat at one side thereof and an outer side wall portion which is spaced from this inner side wall portion to define therewith a space through which the transmission extends to the rear wheel assembly.

7 Claims, 11 Drawing Figures

INVENTORS
RAYMOND J. LOHR
CALVIN S. COOK

BY

*Blum, Moscovitz, Freedman + Kaplan*

ATTORNEYS

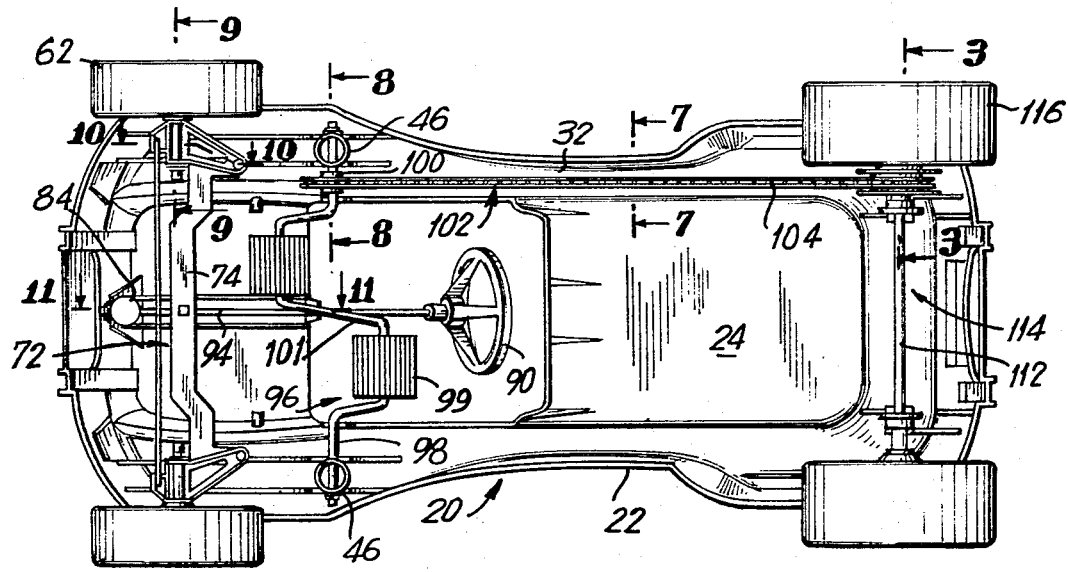
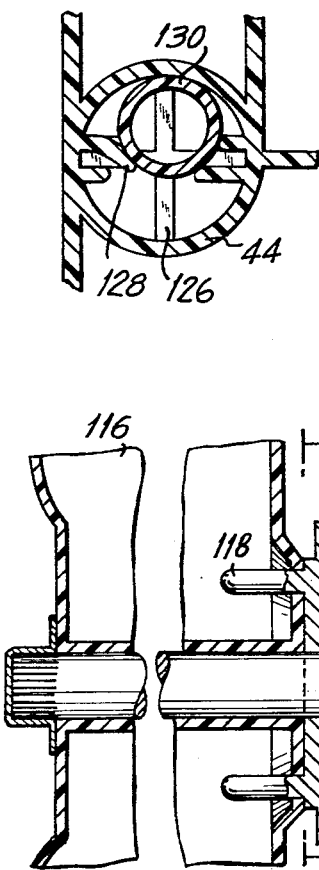
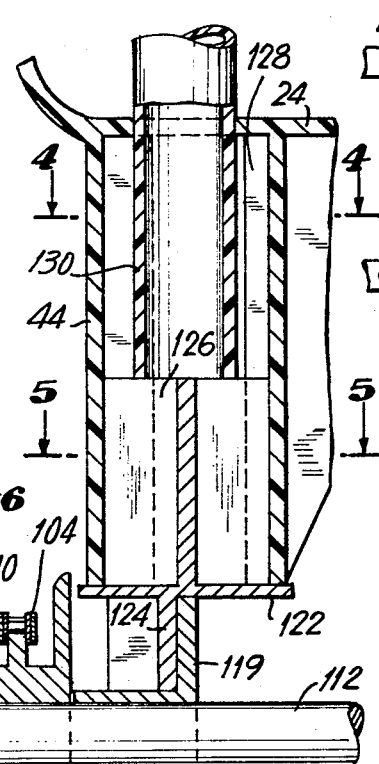
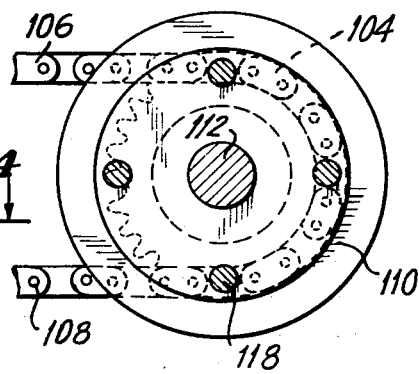

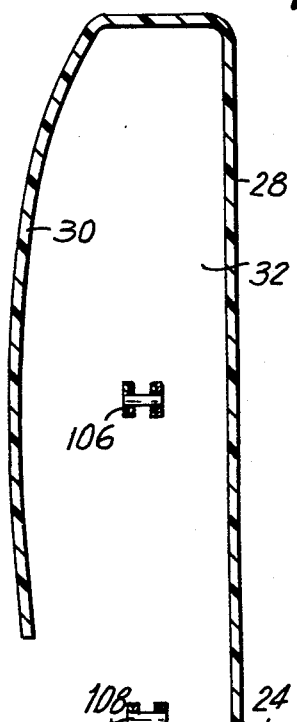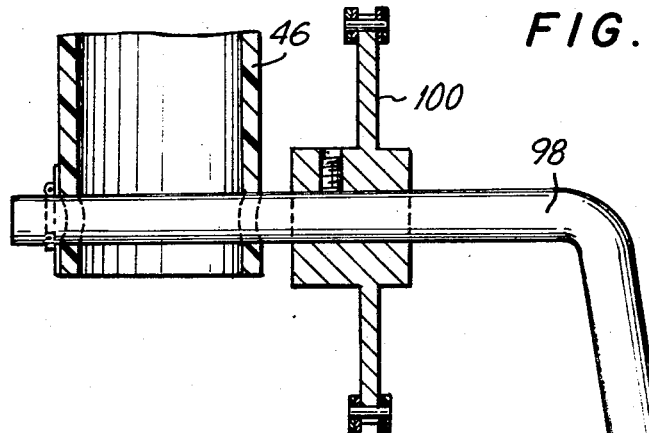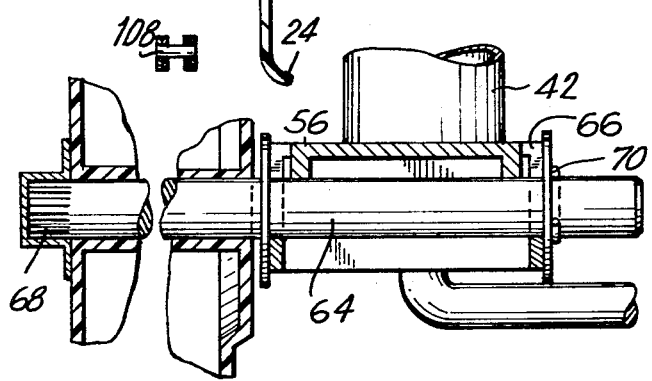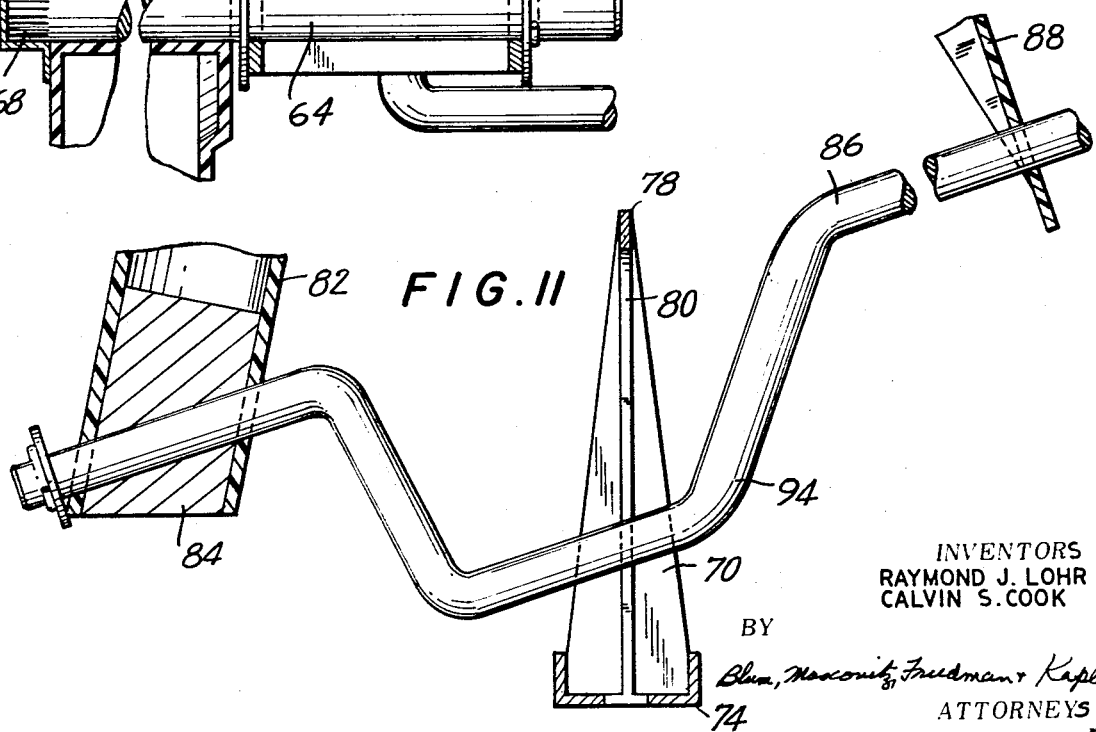

OCCUPANT-PROPELLED VEHICLE

BACKGROUND OF THE INVENTION

The present invention relates to miniature vehicles.

In particular, the present invention relates to miniature road vehicles adapted to be propelled by the occupant of the vehicle.

Vehicles of this general type are of course well known so that children, for example, may seat themselves in such a vehicle and propel the vehicle, deriving in this way not only entertainment but also exercise and education, as well as developing coordination.

The presently known vehicles of this general type suffer from several drawbacks. On the one hand they are relatively expensive to manufacture. On the other hand, they are made up of a multiplicity of components which require considerable amount of skill to assemble properly. Bearing in mind that it is customary at the present time to sell articles of this type in a broken down condition so that the final consumer must assemble the components in his own home, then it is clear that with present day constructions a considerable inconvenience and disadvantage is involved in the known constructions.

A further drawback of vehicles of the above general type is that the occupant necessarily is required to be seated at an undesirably high elevation. The reason for this is that the transmission of the vehicle is required to extend from the front toward the rear, and a considerable amount of clearance is required beneath the seat so as to properly accommodate the transmission. The disadvantage of these arrangements is that on the one hand the miniature vehicle does not simulate to the desired extent actual vehicles, and on the other hand the center of gravity of the vehicle is undesirably high, so that the safety factor is not as yet as might be desired.

SUMMARY OF THE INVENTION

It is accordingly a primary object of the present invention to provide a vehicle of the above general type which will avoid the above drawbacks.

In particular, it is an object of the present invention to provide a vehicle of the above type which is less expensive than conventional vehicles of the above type.

Furthermore, it is an object of the invention to provide a vehicle of the above general type which can be readily and easily assembled even by unskilled persons without even requiring any special tools.

Furthermore, it is an object of the invention to provide a construction of this type which after it is assembled will nevertheless provide a rugged safe vehicle.

In particular, it is an object of the invention to provide a construction where the seat for the occupant of the vehicle can be situated at a relatively low elevation so that the simulation to actual vehicles is more closely achieved and the safety factor is enhanced.

According to the invention the vehicle includes a body of sheet material which forms the chassis. The chassis not only includes the seat for the occupant but also a pair of front tubular portions, a pair of rear tubular portions, and a pair of intermediate tubular portions. A front wheel assembly is operatively connected to the chassis at the front tubular portions thereof, a rear wheel assembly is operatively connected to the chassis at the rear tubular portions thereof, and a rotary drive means, to be actuated by the occupant of the vehicle, is operatively connected to the intermediate tubular portions of the chassis. A transmission means extends from the rotary drive means rearwardly to the rear wheel assembly. The chassis has an inner side wall portion extending upwardly from the seat at one side thereof and an outer side wall portion spaced from the inner side wall portion and defining therewith a space through which the transmission extends from the drive means to the rear wheel assembly, so that in this way the transmission is situated at least at an elevation as high as the seat itself.

BRIEF DESCRIPTION OF DRAWINGS

The invention is illustrated by way of example in the accompanying drawings which form part of this application and in which:

FIG. 2 is a bottom plan view of the vehicle, as seen when looking toward the underneath thereof;

FIG. 3 is a fragmentary sectional elevation showing, on an enlarged scale as compared to FIG. 2, how the rear wheel assembly is attached to the chassis, FIG. 3 being taken along line 3—3 of FIG. 2 in the direction of the arrow;

FIG. 4 is a sectional plan view of the structure of FIG. 3 taken along line 4—4 of FIG. 3 in the direction of the arrow;

FIG. 5 is a sectional plan view of the structure of FIG. 3 taken along line 5—5 of FIG. 3 in the direction of the arrow;

FIG. 6 is a transverse sectional elevation of part of the structure of FIG. 3 taken along line 6—6 of FIG. 3 in the direction of the arrow;

FIG. 7 is a fragmentary sectional elevation, on an enlarged scale as compared to FIG. 2, taken along line 7—7 of FIG. 2 in the direction of the arrows and illustrating how the transmission extends along the chassis;

FIG. 8 is a fragmentary sectional view on an enlarged scale as compared to FIG. 2, taken along line 8—8 of FIG. 2, and illustrating how the rotary drive means is carried by the chassis;

FIG. 9 is a fragmentary sectional elevation taken on an enlarged scale as compared to FIG. 2, along line 9—9 of FIG. 2 in the direction of the arrows, and illustrating how the front wheel assembly is mounted;

FIG. 11 is a longitudinal fragmentary sectional elevation taken along line 11—11 of FIG. 2 in the direction of the arrows and showing, on an enlarged scale as compared to FIG. 2, how the steering means is mounted on the vehicle and actuated.

DESCRIPTION OF A PREFERRED EMBODIMENT

Figure 1:
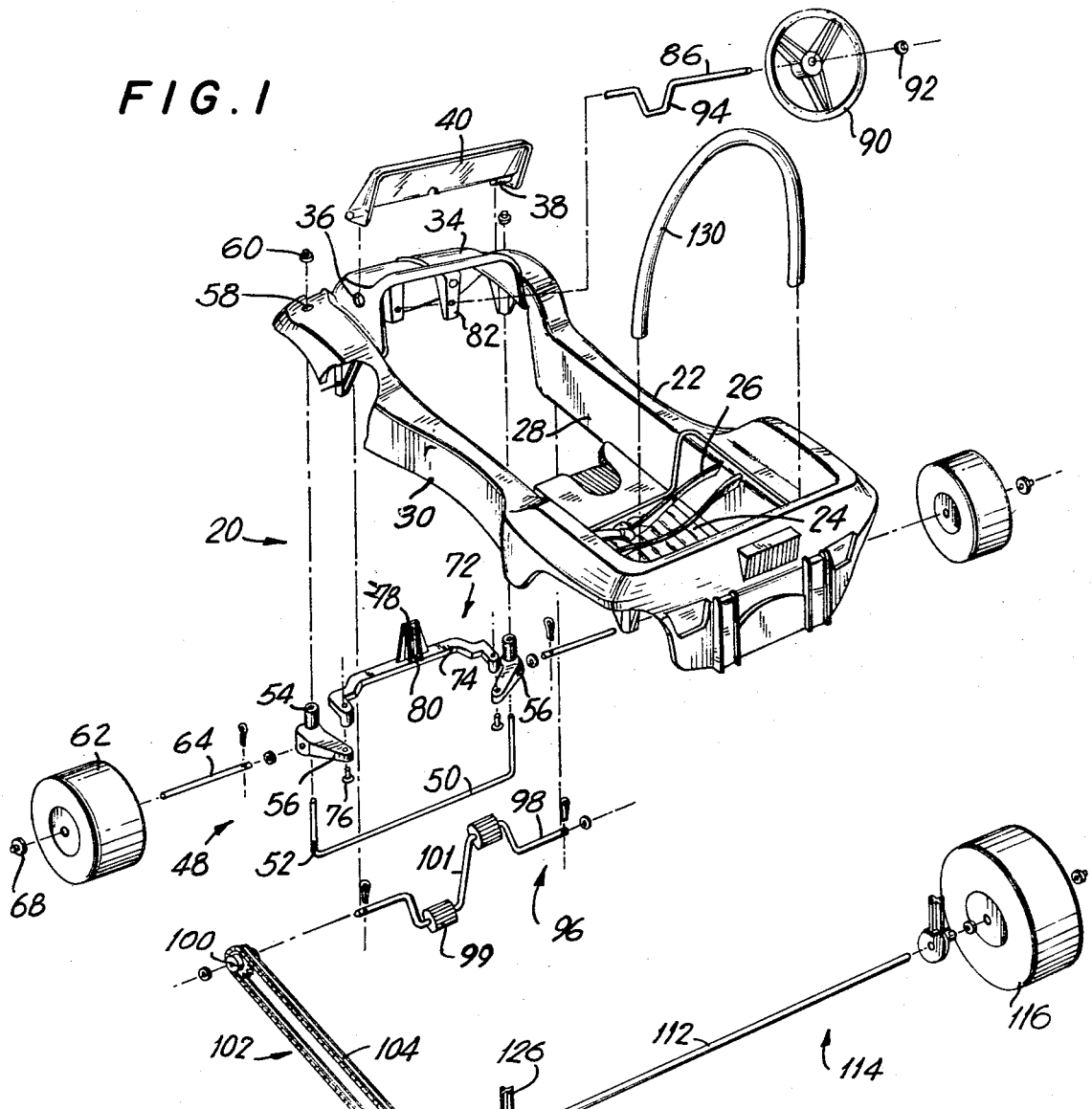
FIG. 1 is an exploded perspective illustration, schematically representing a vehicle according to the invention.

Referring now to the drawings, the miniature vehicle 20 of the present invention, shown in its entirety in FIG. 2 and in an exploded view in FIG. 1, includes a chassis 22. This chassis 22 is in the form of a one-piece body of molded plastic sheet material extending all the way from the front to the rear of the vehicle and including a seat 24 for accommodating the occupant of the vehicle. Suitable belts 26 extend across the side walls of the chassis which extend upwardly from the seat. One of these side walls 28 is shown in FIG. 7. Thus the side wall 28 shown in FIG. 7 forms an inner side wall of the chassis extending upwardly from the seat 24 thereof, and the chassis includes also an outer side wall 30 forming with the side wall 28 the space 32, for a purpose referred to below. It will be noted that the space 32 extends longitudinally along the chassis through a considerable distance, as is apparent from FIG. 2.

Adjacent its front end the chassis has an upwardly and rearwardly slanting wall portion 34 provided at downwardly extending side regions thereof with a pair of openings 36 for respectively receiving pins 38 at lower side regions of a windshield-simulating component 40. Thus this component can readily be assembled with the chassis 22 simply by snapping the pins 38 into the openings 36.

Figure 10:
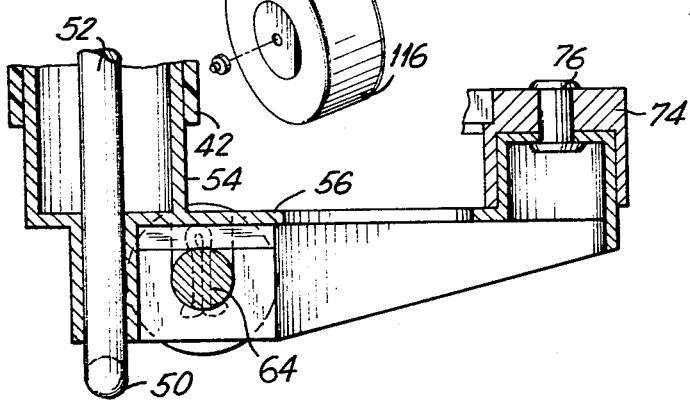
FIG. 10 is a fragmentary sectional elevation taken along line 10—10 of FIG. 2 in the direction of the arrows and showing, on an enlarged scale as compared to FIG. 2, how the front wheel assembly is mounted and actuated by the steering means.

The one-piece molded plastic body which forms the chassis 22 includes a pair of front tubular portions 42, one of which is visible in FIGS. 9 and 10. The chassis also includes, integrally formed with the remainder thereof, a pair of rear tubular portions 44, one of which is visible in FIG. 3. In addition the chassis has integrally formed therewith an intermediate pair of tubular portions 46 both of which are visible in FIG. 2, with one of these tubular portions 46 also being indicated in FIG. 8.

A front wheel assembly 48 is carried by the chassis 22 at the front tubular portions 42 thereof. This front wheel assembly 48 includes a tie rod 50 in the form of an elongated metal rod having a horizontal transverse portion and a pair of opposed vertical end portions 52. These end portions 52 respectively extend up through the tubular parts 54 of cranks 56. Thus, both the tubular parts 54 of the cranks 56 and the vertically extending portions 52 of the tie rod extend into the tubular portions 42, as is apparent from FIG. 10. The upper ends of the end portions 52 of the tie rod 50 are accessible through openings 58 at the top front region of the chassis, at the region of the front ends of the fenders of the vehicle, these ends 58 forming the tops of the tubular portions 42. Through these top open ends 58 it is possible to fix to the top ends of the end portions 52 of the tie rod 50 nuts or caps 60 which fixedly maintain the tie rod 50 in its assembled position indicated in FIG. 10.

The front wheel assembly 48 further includes a pair of front wheels 62 supported on the stub shafts 64 which extend through and are rotatably supported in the bearings 66 of each crank 56 in the manner shown most clearly in FIG. 9. Thus each crank 56 has a transverse top wall portion with a pair of downwardly directed flanges engaging the upper part of the stub shaft 64 while the crank arm has lower parts engaging the under side of these stub shafts. Each stub shaft extends through a wheel 62 and carries an outer cap 68. At its inner end the stub shaft receives a cotter pin 70, so that in this way each wheel is assembled with the crank 56.

It is apparent, therefore, that all that is required to connect the front wheel assembly 48 with the chassis is to slip the tie rod 50 at its end portions 52 through the tubular portions at the front ends of the cranks 56, as indicated in FIG. 10, and then these tubular portions together with the tie rod are slipped up into the tubular portions 42 of the chassis, whereupon fasteners 60 are fixed to the top ends of portions 52 of the tie rod, and in this simple way the front wheel assembly is attached to the chassis to remain reliably connected therewith.

The steering means 72 includes a transverse bar 74 pivotally connected at its ends to the ends of the crank arms 56 distant from the tie rod 50. It will be noted that FIG. 10 shows an end of the bar 74 pivotally connected to the crank arm 56 by a rivet 76. This bar 74 of course comes pre-assembled with the crank arms. This bar 74 has intermediate its ends an upwardly extending portion 78 formed with an elongated vertically extending cutout or slot 80. See also FIG. 11.

The chassis 22 has an additional tubular portion 82 integral with the one-piece body of the chassis and extending downwardly from the front hood portion 34 thereof. The lower end of the tubular portion 82 is apparent from FIG. 11. It carries in its interior a block 84 which is formed with an inclined bore extending also through the tubular portion 82 for receiving the front end of a crank-shaped rotary steering column 86 of the steering means 72. Any suitable washer and snap ring or washer and cotter pin is situated adjacent the bottom end of the steering column 86 for maintaining the parts assembled in the condition shown in FIG. 11.

At its rear edge region, the hood 34 of the chassis is integrally formed with a downwardly extending angled projection 88 carrying the simulation of an ignition key and formed with an opening for receiving the upper end of the steering column 86. After the steering column is passed through the opening of the extension 88 of the chassis 22, a steering wheel 90 is fastened to the top end of the steering column, as by a suitable nut 92. The cranked portion 94 of the steering column 86 passes through the slot 80. Thus when the operator turns the steering wheel 90 the column 86 will turn. The cranked portion 94 thereof will shift the extension 78 to the right or left, causing the bar 74 to shift to the right or left, and causing simultaneous turning of the cranks 56 in one direction or the other, so as to swing these cranks about the vertically extending end portions 52 of the tie rod 50, thus bringing about steering of the vehicle.

The rotary drive means 96 is in the form of a rotary driving rod 98 carrying suitable pedals 99 at cranked portions 101 of this rod. The end portions of the rod 98 extend through the tubular portions 46 in the manner shown most clearly in FIG. 8, and at its outer ends the rod 98 carries cotter pins and washers for maintaining the rod 98 rotatably assembled with the tubular portions 46 which are integral with the chassis 22. The left tubular portion 46, which is the one illustrated in FIG. 8, is situated adjacent a rotary sprocket wheel 100 of the transmission means 102 of the invention. This sprocket wheel 100 is fixed to the rod 98 for rotation therewith.

In addition to the sprocket wheel 100, the transmission means 102 includes an elongated sprocket chain 104. This sprocket chain 104 has an upper run 106 and a lower run 108 shown respectively in cross section in FIG. 7. It will be noted that these upper and lower runs of the sprocket chain extend longitudinally along the space 32 between the inner side wall 28 and the outer side wall 30 of the chassis, so that in this way the transmission of the invention can be situated at an elevation which is at least as high as and in fact considerably higher than the seat 24. Thus this seat 24 can be situated at an extremely low elevation providing a better simulation of an actual vehicle and also lowering the center of gravity for safety purposes.

The transmission means also includes a rear sprocket wheel 110 which receives the chain 104 of the transmission means 102.

This rear sprocket wheel 110 is formed with an axial bore through which a rear axle 112 extends. This rear axle 112 forms part of a rear wheel assembly 114. Also, the rear wheel assembly includes a pair of rear wheels 116 one of which is formed at its inner hub with bores for receiving pins 118 integral with and projecting from the sprocket wheel 110, so that in this way the drive is transmitted to the rear wheels 116. These rear wheels are fixed on the axle 112 which is capable of turning in bearings 119. The bearings 119 of the rear wheel assembly 114 are fixed, as by bolts and nuts 120 to extensions 122. These extensions 122 have wall portions 124 formed with openings through which the tubular sleeves 127 which constitute the bearings 119 extend.

The extensions 122 have upwardly extending web portions 126 which intersect each other perpendicularly so as to provide these portions 126 with a X-shaped cross section, most clearly apparent from FIG. 5. Each of the tubular extensions 44 is provided at its interior with two pairs of directly opposed ribs 128 which receive the opposed edges of one of the webs 126 as is most clearly apparent from FIGS. 4 and 5, as well as from FIG. 3. The manner in which the tubular portions 44 extend integrally downwardly from the seat 24 is most clearly apparent from FIG. 3. The seat 24 is formed at its rear edge portion with a pair of openings through which a curved plastic roll bar 130 can extend with the bottom end portions of this bar being received within the tubular portions 44 and deflecting one of the ribs 128 in the manner most clearly apparent from FIG. 4.

It is thus clear that with the structure described above after the rear wheel assembly 114 has had the components thereof assembled together, it is only necessary for the operator to push the web portions 126 into the tubular portions 44, along the spaces between the ribs 128 thereof, and through this simple expedient the entire rear wheel assembly 144 is assembled with the chassis. Of course the chain 104 has already been placed around the sprocket wheels before the rear wheel assembly is assembled with the chassis. Then the roll bar 130 may be introduced through the rear openings at the seat into the tubular portions 44 so that the parts will have the positions indicated in FIGS. 3 and 4.

It is therefore apparent that with the structure of the invention all that is required is to assemble various rods or the like through the use of cotter pins and washers, and otherwise components are simply introduced into tubular portions of the chassis in which they will remain assembled. For example in the case of the rear wheel assembly, as long as the vehicle remains in an upright position the downward gravity and the weight of the occupant will keep the tubular portions 44 pressing downwardly against the horizontal portions of extensions 122 which are situated at the bottom ends of the webs 126. The components 60 maintain the tie rod 50 assembled with the chassis, so that in this way the entire front wheel assembly is maintained assembled with the chassis. Of course, the steering means will remain assembled with the chassis as a result of the structure shown in FIG. 11.

Thus, with the simple structure described above an extremely safe and at the same time inexpensive and rugged vehicle is provided to be propelled by the occupant.

What is claimed is:

1. In a miniature, occupant-propelled surface vehicle, a body of sheet material forming a chassis which includes a seat for the occupant and which has a pair of front tubular portions, a pair of rear tubular portions, and a pair of intermediate tubular portions, a rotary front wheel assembly connected with chassis at said front tubular portions thereof, a rotary rear wheel assembly connected with said chassis at said rear tubular portions thereof, and a rotary drive means, to be rotated by the occupant of the vehicle, and operatively connected with said intermediate tubular portions of said chassis, transmission means operatively connected with said rotary drive means and extending therefrom rearwardly to said rear wheel assembly for transmitting a drive to the latter from said rotary drive means, for propelling the vehicle, and manually operable steering means carried by said chassis and operatively connected with said front wheel assembly for actuating the latter to steer the vehicle, said transmission means being situated at an elevation at least as high as said seat of said chassis, said chassis having an inner side wall portion extending upwardly from said seat and an outer side wall portion spaced from said inner side wall portion and defining therewith a space through which said transmission means extends, said rotary drive means being in the form of a transversely extending rotary drive rod having cranked portions carrying pedals to receive the feet of the occupant of the vehicle, said drive rod extending through and being rotatably supported by said intermediate tubular portions of said chassis, said transmission means including a sprocket wheel carried by said rod, a rear axle forming part of said rear wheel assembly, a second sprocket wheel carried by said rear axle and said rear wheel assembly having a pair of wheels one of which is fixed with said sprocket to rotate therewith, and a sprocket chain extending between and carried by said sprocket wheels for transmitting the drive from said rotary drive rod to said rear axle and the rear wheels thereof, said chassis seat being situated at an elevation above which said sprocket chain extends, and said chain extending through said space to the rear sprocket wheel of said transmission means.

2. The combination of claim 1 and wherein said rear wheel assembly includes a rear axle, a pair of rear wheels operatively connected therewith, a pair of bearings through which said axle extends, and a pair of extensions extending from said bearings upwardly into the rear pair of tubular portions of said chassis for connecting said rear wheel assembly thereto.

3. The combination of claim 1 and wherein said chassis is formed from a one-piece body of molded plastic sheet material.

4. The combination of claim 3 and wherein said chassis has at least one additional integral tubular portion for forming at least part of a support for said steering means.

5. In a miniature, occupant-propelled surface vehicle, a body of sheet material forming a chassis which includes a seat for the occupant and which has a pair of front tubular portions, a pair of rear tubular portions, and a pair of intermediate tubular portions, a rotary front wheel assembly connected with chassis at said front tubular portions thereof, a rotary rear wheel assembly connected with said chassis at said rear tubular portions thereof, and a rotary drive means, to be rotated by the occupant of the vehicle, and operatively connected with said intermediate tubular portions of said chassis, transmission means operatively connected with said rotary drive means and extending therefrom rearwardly to said rear wheel assembly for transmitting a drive to the latter from said rotary drive means, for propelling the vehicle, and manually operable steering means carried by said chassis and operatively connected with said front wheel assembly for actuating the latter to steer the vehicle, said rear wheel assembly including a rear axle, a pair of rear wheels operatively connected therewith, a pair of bearings through which said axle extends, and a pair of extensions extending from said bearings upwardly into the rear pair of tubular portions of said chassis for connecting said rear wheel assembly thereto, said extensions each being composed of a pair of perpendicularly intersecting webs providing said extensions with an X-shaped cross section, said rear tubular extensions each being provided with at least two pairs of opposed inwardly extending webs for receiving opposed free edge portions of one of said webs of each extension.

6. In a miniature, occupant-propelled surface vehicle, a body of sheet material forming a chassis which includes a seat for the occupant and which has a pair of front tubular portions, a pair of rear tubular portions, and a pair of intermediate tubular portions, a rotary front wheel assembly connected with chassis at said front tubular portions thereof, a rotary rear wheel assembly connected with said chassis at said rear tubular portions thereof, and a rotary drive means, to be rotated by the occupant of the vehicle, and operatively connected with said intermediate tubular portions of said chassis, transmission means operatively connected with said rotary drive means and extending therefrom rearwardly to said rear wheel assembly for transmitting a drive to the latter from said rotary drive means, for propelling the vehicle, and manually operable steering means carried by said chassis and operatively connected with said front wheel assembly for actuating the latter to steer the vehicle, said front wheel assembly including a tie rod having a lower transverse portion and a pair of opposed vertically extending end portions extending upwardly from opposed ends of said transverse portion into said front tubular portions of said chassis and releasably fixed to said chassis at said front tubular portions thereof, a pair of cranks respectively swingable on said vertically extending end portions of said tie rod, also extending into said front tubular portions of said chassis, and having crank arms which extend rearwardly from said end portions of said tie rod, a pair of wheels rotatably connected to said cranks adjacent to said tie rod, and a transverse bar having opposed ends pivotally connected to said arms at portions thereof distant from said tie rod.

7. The combination of claim 6 and wherein said steering means includes a rotary steering column turnably carried by said chassis and having a steering wheel accessible to the occupant of the vehicle, said column having a crank portion, and said transverse bar being formed intermediate said crank arms with a cutout receiving said crank arm of said steering column so that when the latter turns said bar is shifted horizontally for swinging said cranks in one direction or the other to turn the wheels of said front wheel assembly so as to steer the vehicle.

* * * * *